(12) United States Patent
Kobayashi

(10) Patent No.: US 12,742,911 B2
(45) Date of Patent: Sep. 22, 2026

(54) OPTICAL SYSTEM AND IMAGE CAPTURING APPARATUS INCLUDING THE SAME

(71) Applicant: CANON KABUSHIKI KAISHA, Tokyo (JP)

(72) Inventor: Kana Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 876 days.

(21) Appl. No.: 18/055,213

(22) Filed: Nov. 14, 2022

(65) Prior Publication Data

US 2023/0168413 A1 Jun. 1, 2023

(30) Foreign Application Priority Data

Nov. 24, 2021 (JP) ................................ 2021-190616

(51) Int. Cl.
*G02B 1/115* (2015.01)

(52) U.S. Cl.
CPC .................................. *G02B 1/115* (2013.01)

(58) Field of Classification Search
CPC ...................................................... G02B 1/115
See application file for complete search history.

(56) References Cited

FOREIGN PATENT DOCUMENTS

JP 2012141594 A 7/2012
WO 2014132796 A1 9/2014

OTHER PUBLICATIONS

WO-2014132796, translation (Year: 2014).*

* cited by examiner

*Primary Examiner* — Wen Huang
(74) *Attorney, Agent, or Firm* — Canon U.S.A. Inc. IP Division

(57) ABSTRACT

An optical system OL consists of a front lens group L and a negative lens Gn on an image side of the front lens group L. The lens Gn includes a first lens surface, and the first lens surface is a lens surface that satisfies the following inequality:

$$45° < |\Theta| < 65°,$$

where Θ is an opening angle at an effective diameter. The first lens surface is provided with an antireflection film, and a predetermined inequality relating to a reflectance is satisfied.

11 Claims, 14 Drawing Sheets

Fno = 1.3
d
g
-0.400
0.400
SPHERICAL ABERRATION
ω = 32.8°
ΔS
ΔM
-0.400
0.400
ASTIGMATISM
ω = 32.8°
-10.000
10.000
DISTORTION (%)
ω = 32.8°
g
-0.050
0.050
CHROMATIC ABERRATION

Fno = 1.3
d
g
-0.400
0.400
SPHERICAL ABERRATION
ω = 32.8°
ΔS
ΔM
-0.400
0.400
ASTIGMATISM
ω = 32.8°
-5.000
5.000
DISTORTION (%)
ω = 32.8°
g
-0.050
0.050
CHROMATIC ABERRATION

FIG.8

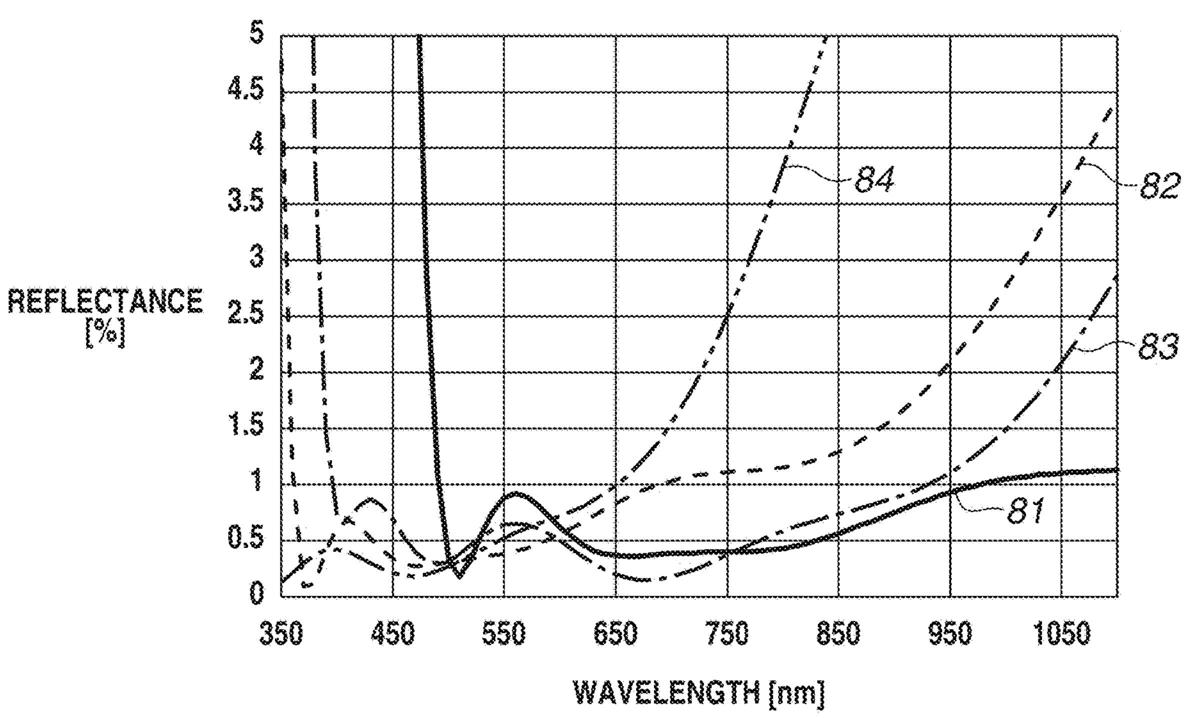

FIRST EXAMPLE. RREFLECTANCES IN REFLECTING LIGHT RAYS INCIDENT NORMALLY ON POSITION ON OPTICAL AXIS OF LENS SURFACE FIRST EXAMPLE. REFLECTANCES IN REFLECTING LIGHT RAYS INCIDENT NORMALLY ON POSITION AT ANGULAR APERTURE OF 45 DEGREES ON LENS SURFACE COMPARATIVE EXAMPLE. RREFLECTANCES IN REFLECTING LIGHT RAYS INCIDENT NORMALLY ON POSITION ON OPTICAL AXIS OF LENS SURFACE COMPARATIVE EXAMPLE. REFLECTANCES IN REFLECTING LIGHT RAYS INCIDENT NORMALLY ON POSITION AT ANGULAR APERTURE OF 45 DEGREES ON LENS SURFACE SECOND EXAMPLE. RREFLECTANCES IN REFLECTING LIGHT RAYS INCIDENT NORMALLY ON POSITION ON OPTICAL AXIS OF LENS SURFACE SECOND EXAMPLE. REFLECTANCES IN REFLECTING LIGHT RAYS INCIDENT NORMALLY ON POSITION AT ANGULAR APERTURE OF 45 DEGREES ON LENS SURFACE THIRD EXAMPLE. RREFLECTANCES IN REFLECTING LIGHT RAYS INCIDENT NORMALLY ON POSITION ON OPTICAL AXIS OF LENS SURFACE THIRD EXAMPLE. REFLECTANCES IN REFLECTING LIGHT RAYS INCIDENT NORMALLY ON POSITION AT ANGULAR APERTURE OF 45 DEGREES ON LENS SURFACE

OPTICAL SYSTEM AND IMAGE CAPTURING APPARATUS INCLUDING THE SAME

BACKGROUND

Technical Field

The aspect of the embodiments relates to an optical system suitable for use in image capturing apparatuses such as digital video cameras, digital still cameras, broadcast cameras, monitoring cameras, cameras for wearable devices, and cameras for mobile devices.

Description of the Related Art

There are demands for high performance optical systems with reduced occurrences of ghost and flare. To reduce occurrences of ghost and flare, there are known methods with an antireflection film provided to a lens surface.

In recent trends, optical systems are smaller in size with a larger aperture, resulting in a larger opening angle.

However, a larger opening angle can have a less effect of antireflection around its optical axis than that on its optical axis due to issues in manufacturing antireflection films.

Japanese Patent Application Laid-Open No. 2012-141594 discusses an antireflection film that is multi-layered with a reflectance of 0.4% or less in reflecting light incident at an angle of zero degrees in the visible range.

According to Japanese Patent Application Laid-Open No. 2012-141594, an increased number of layers of the antireflection film or a film with a special structure reduces reflectance in the visible range. However, with a larger opening angle of a lens (e.g., greater than 45 degrees of opening angle), an adequate antireflection effect may not be produced especially at peripheral portions. If image capturing is performed in a wavelength range including the near-infrared range as well as the visible range, it may be difficult to prevent reflection at sufficient wavelength bands.

SUMMARY

According to an aspect of the embodiments, a system consists of a front lens group and a negative lens Gn on an image side of the front lens group. The negative lens Gn includes a first lens surface, and the first lens surface is a lens surface that satisfies the following inequality:

$$45° < |\Theta| < 65°,$$

where Θ is an opening angle at an effective diameter. The first lens surface is provided with an antireflection film. The following inequalities are satisfied:

$$R\_R45 < 1.5\%,$$

$$R\_G45 < 1.5\%, \text{ and}$$

$$R\_R0 < 1.0\%,$$

where R_R0 is a reflectance in reflecting a light ray with a wavelength of 700 nm that is vertically incident on a position on an optical axis of the first lens surface, R_R45 is a reflectance in reflecting a light ray with a wavelength of 700 nm that is vertically incident on a position at an opening angle of 45 degrees on the first lens surface, and R_G45 is a reflectance in reflecting a light ray with a wavelength of 530 nm that is vertically incident on the position at an opening angle of 45 degrees on the first lens surface.

Further features of the disclosure will become apparent from the following description of exemplary embodiments with reference to the attached drawings.

BRIEF DESCRIPTION OF THE DRAWINGS

FIG. 8 illustrates reflectance properties of the antireflection film according to the first example and the antireflection film according to the comparative example.

DESCRIPTION OF THE EMBODIMENTS

Optical systems and image capturing apparatuses including the optical systems according to exemplary embodiments of the disclosure will be described below with reference to the attached drawings.

Figure 1:
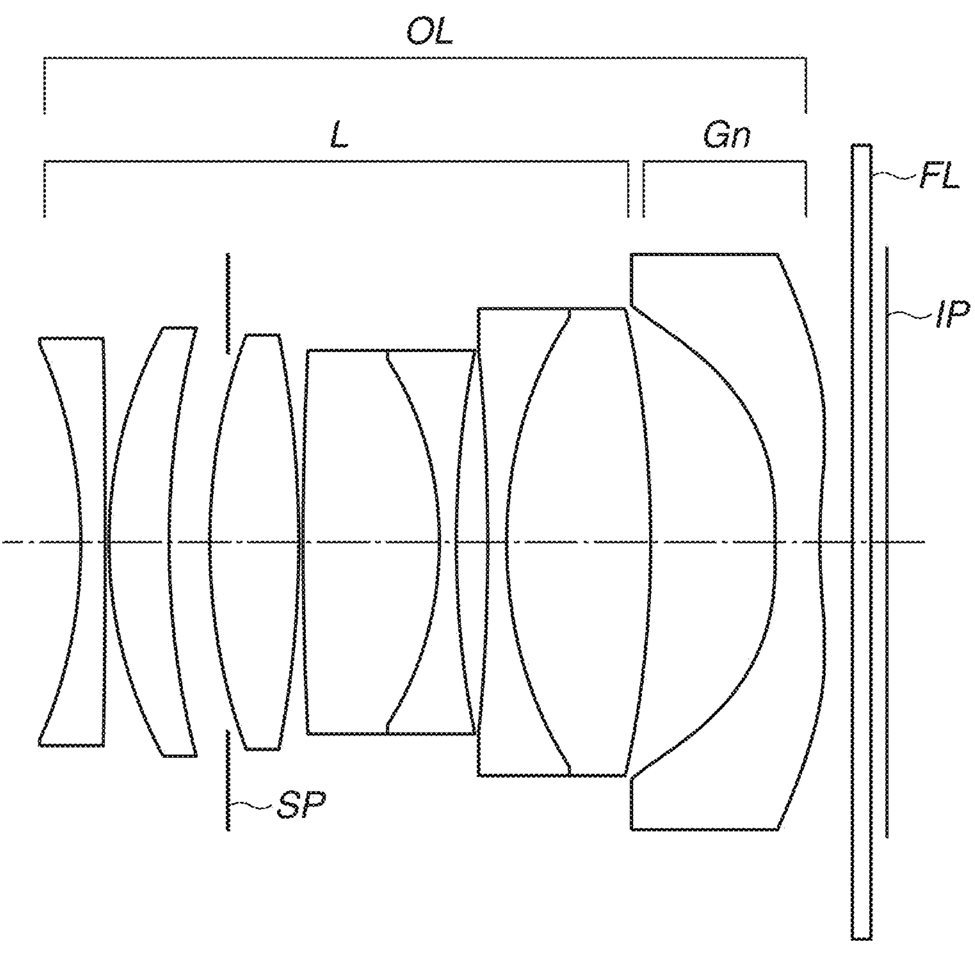
FIG. 1 is a cross-sectional view illustrating lenses of an optical system according to a first exemplary embodiment.
Figure 3:
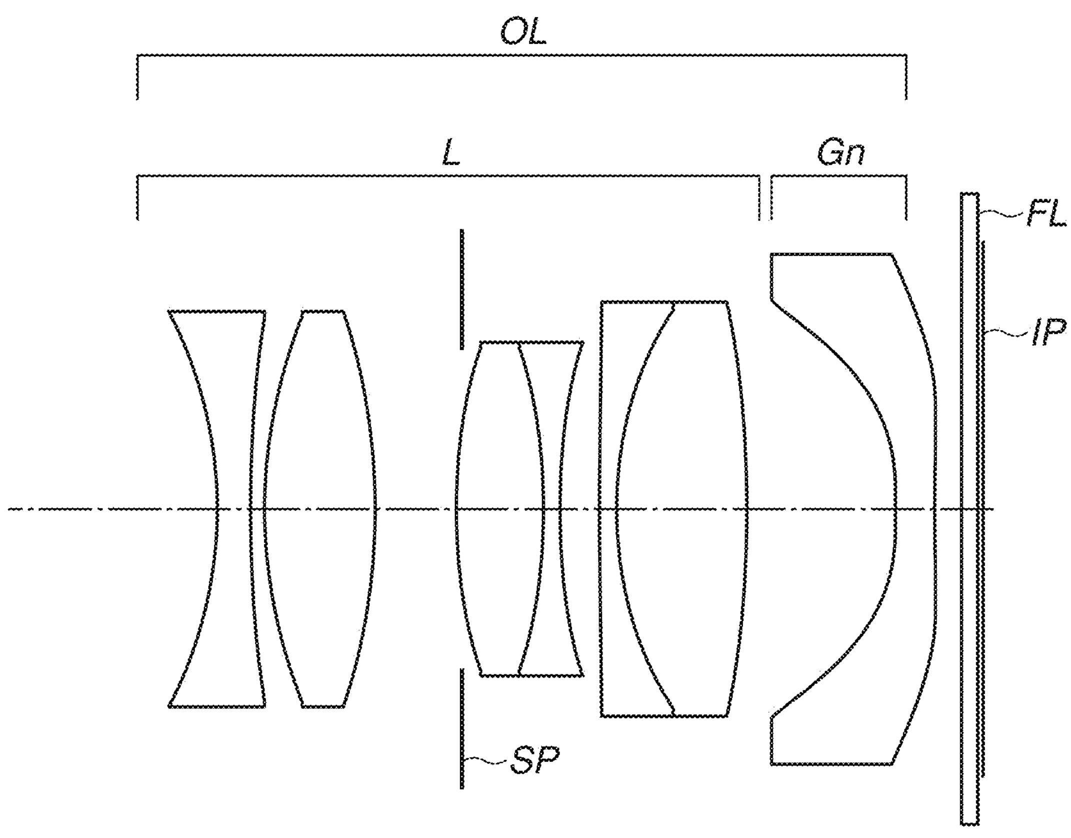
FIG. 3 is a cross-sectional view illustrating lenses of an optical system according to a second exemplary embodiment.

FIGS. 1 and 3 are cross-sectional views illustrating optical systems OL according to first and second exemplary embodiments, respectively. The optical systems OL according to the first and second exemplary embodiments are optical systems for use in image capturing apparatuses such as digital video cameras, digital still cameras, broadcast cameras, monitoring cameras, in-vehicle cameras, cameras for wearable devices, and cameras for mobile devices.

In the cross-sectional views illustrating lenses, the left is an object side, and the right is an image side.

The optical systems OL according to the exemplary embodiments each consist of a front lens group L and a negative lens Gn on the image side of the front lens group L. The front lens group L includes an aperture stop SP.

The cross-sectional views illustrating the lenses each illustrate an image plane IP, and in using the optical systems OL according to the exemplary embodiments in digital cameras, the imaging plane of a solid-state image sensor (photoelectric conversion element) such as a charge-coupled device (CCD) sensor or a complementary metal oxide semiconductor (COMS) sensor is arranged at the image plane IP. In using the optical systems OL according to the exemplary embodiments as an imaging optical system of a silver-halide film camera, the photosensitive surface corresponding to the film surface is arranged at the image plane IP. An optical block FL corresponds to an optical filter, a faceplate, a low-pass filter, an infrared cut filter, or a sensor protection glass.

The optical systems OL according to the exemplary embodiments each can focus by moving the entire optical system OL or part of the lenses of the optical system OL in the optical axis direction.

Figure 2:
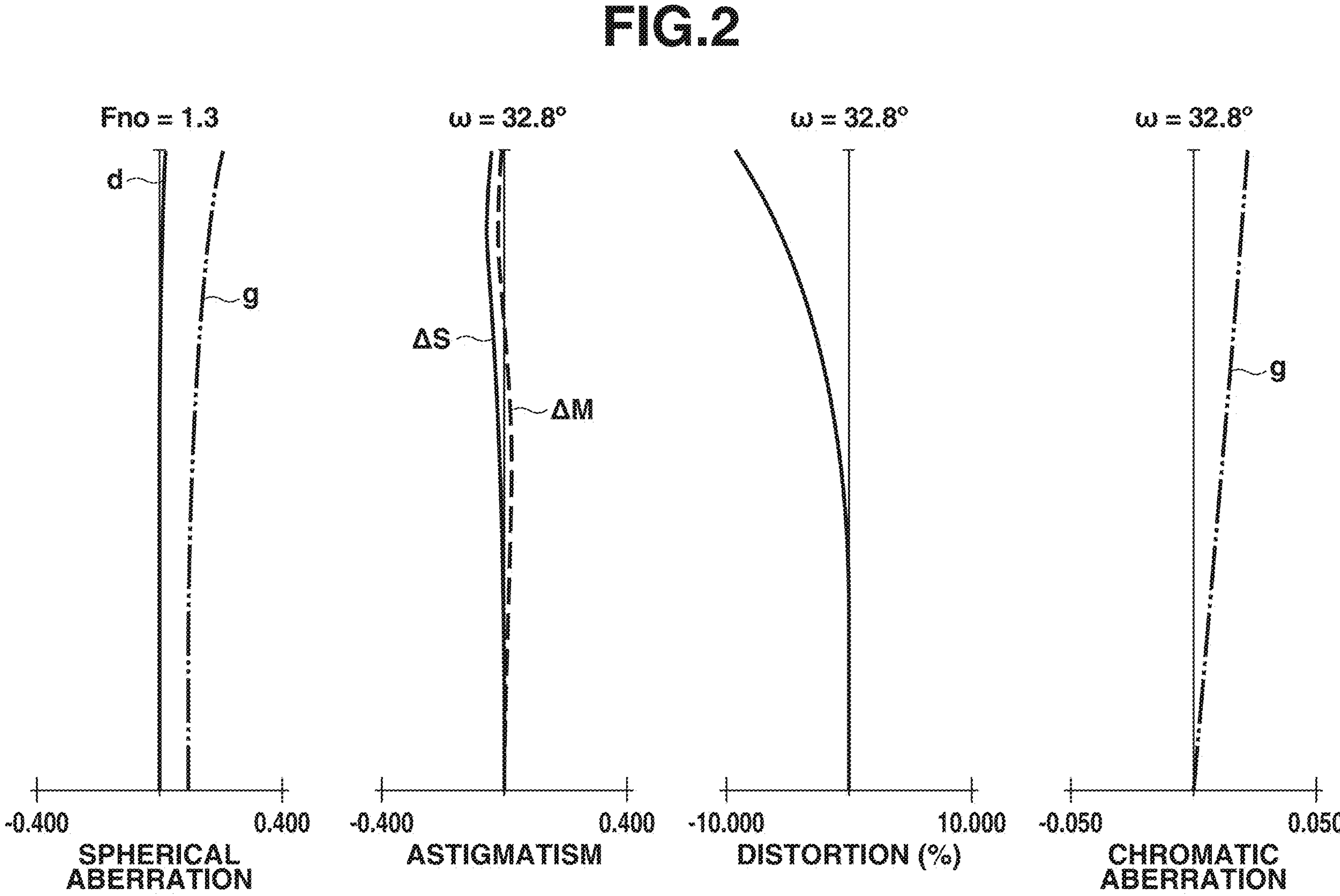
FIG. 2 is an aberration diagram of the optical system according to the first exemplary embodiment.
Figure 4:
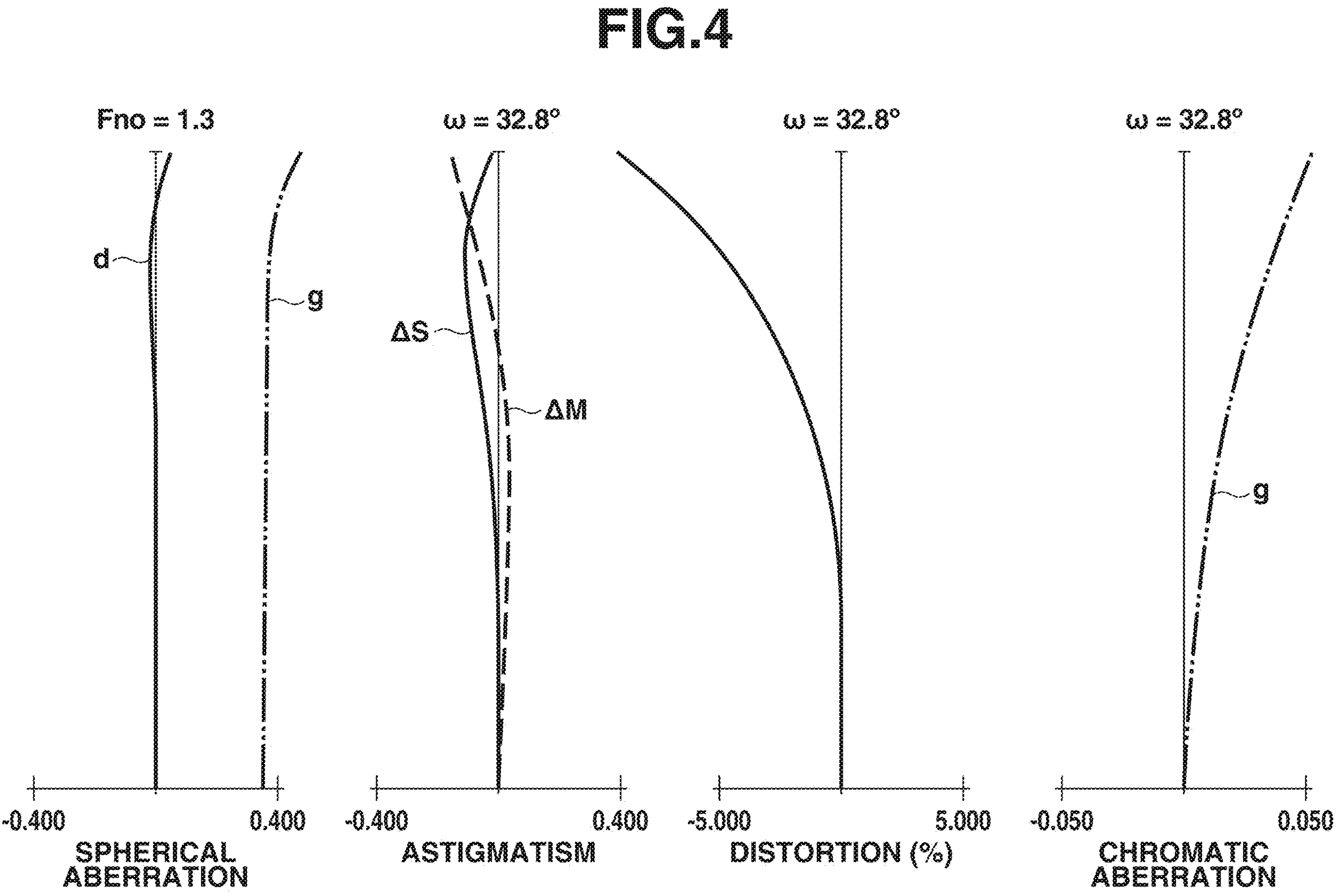
FIG. 4 is an aberration diagram of the optical system according to the second exemplary embodiment.

FIGS. 2 and 4 are aberration diagrams of the optical systems OL according to the first and second exemplary embodiments, respectively. Each aberration diagram illustrates a case where an object is at an infinite distance and a case where the object is at a proximate distance.

Each spherical aberration diagram illustrates an F-number Fno and the amounts of spherical aberrations with respect to d-line (wavelength 587.6 nm) and g-line (wavelength 435.8 nm). Each astigmatism diagram illustrates the amounts of aberrations $\Delta S$ and $\Delta M$ on sagittal and meridional image planes, respectively. Each distortion aberration diagram illustrates the amount of distortion with respect to d-line. Each chromatic aberration diagram illustrates the amount of magnification chromatic aberration with respect to g-line. $\omega$ represents a half angle of view (°) of image capturing.

Next, features of structures of the optical systems OL according to the exemplary embodiments will be described.

As described above, each optical system OL consists of the front lens group L and the negative lens Gn. With a greater refractive power of the front lens group L for a reduced size, the positive Petzval sum increases, producing a field curvature under significantly. Thus, the lens Gn with negative refractive power is arranged on the image side of the front lens group L to correct the positive Petzval sum of the lens group L. In one embodiment, the negative lens Gn is arranged with its concave surface on the object side.

Further, the negative lens Gn includes a first lens surface satisfying inequality (1) below. In the optical systems OL according to the exemplary embodiments, an object-side surface of the negative lens Gn is a first lens surface.

$$45° < |\Theta| < 65° \quad (1),$$

where $\Theta$ is an opening angle at the effective diameter.

Inequality (1) defines the absolute value of the opening angle of the negative lens Gn. Absolute values of the opening angle of the negative lens Gn that are greater than the upper limit value of inequality (1) are undesirable because it becomes difficult to form the negative lens Gn. Absolute values of the opening angle of the negative lens Gn that are lower than the lower limit value of inequality (1) are undesirable because it may become difficult to reduce field curvatures and astigmatisms.

Figure 13:
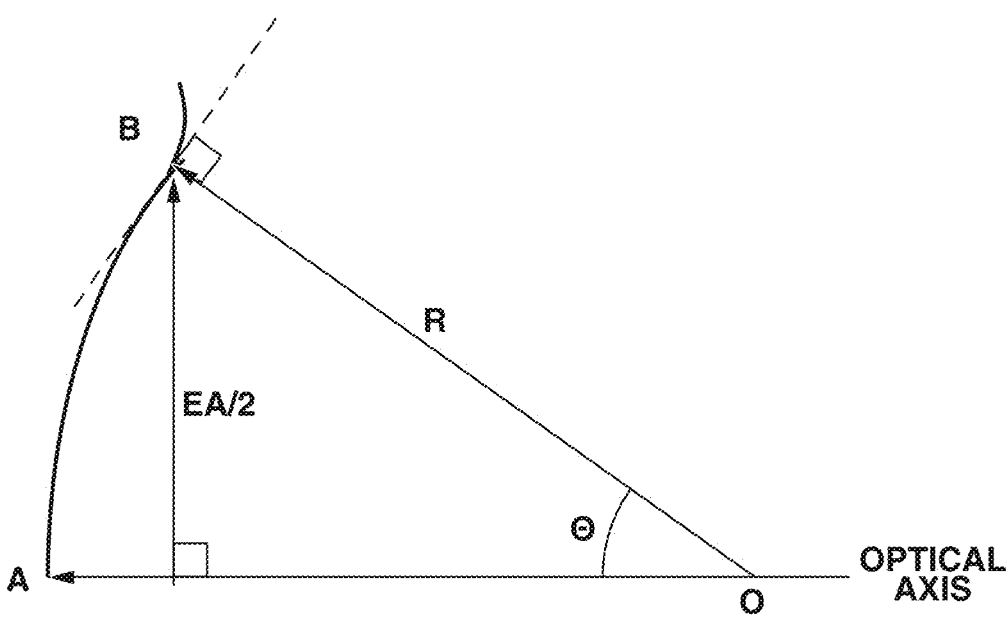
FIG. 13 illustrates an opening angle.

A definition of the opening angle $\Theta$ at the effective diameter will be described with reference to FIG. 13. The opening angle $\Theta$ at the effective diameter is calculated by:

$$\Theta = \text{angle } BOA = \sin^{-1}\{(EA/2)/R\},$$

where O is an origin point at which the straight line that passes through a surface vertex A of a lens with an effective diameter EA and is parallel to the optical axis and the normal line of the tangent line of a surface of the lens with the effective diameter EA that passes through a position B on the surface of the lens intersect with each other, and a length OB is a curvature radius R of a reference spherical surface. The curvature radius R of the reference spherical surface refers to a curvature radius of a spherical surface that passes through the surface vertex A and the position B on the surface of the lens. In the present specification, the effective diameter of a lens refers to the diameter of a circle having a radius that is a height from the optical axis of the light ray passing through the farthest position from the optical axis among light rays passing through a surface of the lens.

The opening angle $\Theta$ is calculated using the tangent line at a position of the effective diameter and the normal line of the tangent line. Hereinafter, the phrase "position at an opening angle of 45 degrees" refers to a position on a surface of the lens at which an opening angle calculated using the tangent line at a position and the normal line of the tangent line is 45 degrees.

Furthermore, in the optical systems OL according to the exemplary embodiments, an antireflection film including a multilayer film is formed on the first lens surface of the negative lens Gn to prevent light reflected from the first lens surface of the negative lens Gn from becoming ghost light.

In general, reflectance properties of an antireflection film are expressed as the reflectance with respect to the wavelengths of a light ray vertically incident on a position on the optical axis of a lens. The antireflection film has a tendency to decrease in thickness with a greater opening angle of the lens. Thus, a lens surface with an opening angle of greater than or equal to 45 degrees can have difficulty having reflectance properties even with an antireflection film that produces reflectance properties at a position on the optical axis. Specifically, a lens with a greater opening angle can have an issue of reflection light at peripheral portions of the lens.

Figure 5:
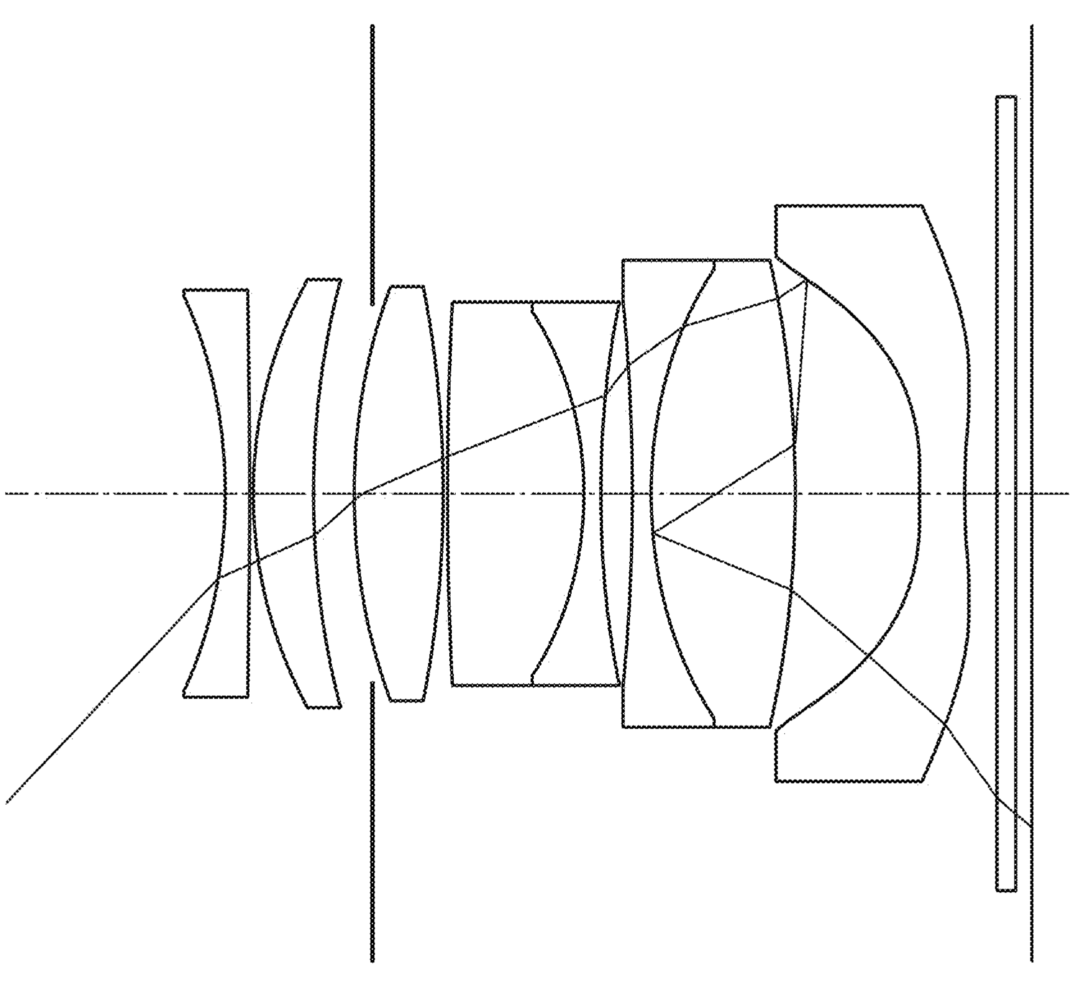
FIG. 5 illustrates an example of an optical path of unnecessary light.

FIG. 5 illustrates an example of an optical path of ghost in an optical system including a lens with a great opening angle. A light ray having entered from the object side and reached an image plane after being reflected at lens surfaces can become ghost light (light that causes ghost) and degrade image quality.

Furthermore, if reflection light having red-long wavelengths occurs with high intensity, the visibility of ghost light increases, which makes the ghost light noticeable.

Thus, the antireflection film for use in the optical systems OL according to the exemplary embodiments is configured to reduce the visibility of ghost caused by especially a lens surface (the first lens surface) that has a great opening angle with an appropriately designed reflectance with respect to the wavelengths. Specifically, the antireflection film for use in the optical systems OL according to the exemplary embodiments satisfies the following inequalities:

$$R\_R45 < 1.5\% \quad (2),$$

$$R\_G45 < 1.5\% \quad (3), \text{ and}$$

$$R\_R0 < 1.0\% \quad (4).$$

In the foregoing inequalities, R_R0 is a reflectance in reflecting a light ray with a wavelength of 700 nm that is vertically incident on a position on the optical axis of the first lens surface. Further, R_R45 is a reflectance in reflecting a light ray with a wavelength of 700 nm that is vertically incident on a position at an opening angle of 45 degrees on the first lens surface. Further, R_G45 is a reflectance in reflecting a light ray with a wavelength of 530 nm that is vertically incident on a position at an opening angle of 45 degrees on the first lens surface.

Values of R_R45 that are greater than the upper limit value of inequality (2) are undesirable because the reflectance at long wavelengths increases, producing ghost with high, noticeable visibility.

Values of R_G45 that are greater than the upper limit value of inequality (3) are undesirable because the reflectance in the visible range increases, which makes ghost noticeable.

Values of R_R0 that are greater than the upper limit value of inequality (4) are undesirable because the quantity of transmitted light decreases.

Satisfying inequalities (2) and (3) reduces ghost across a wavelength range from the visible range to the near infrared range. Further, satisfying inequalities (2) and (4) simultaneously is from the point of view of ghost reduction because a substantially uniform antireflection effect is produced across central and peripheral portions of the lens.

The foregoing structure allows an optical system to reduce especially ghost across a wavelength range with a great lens aperture and a small lens size.

In one embodiment, at least one of the upper limit value or the lower limit value of any numerical value range of inequalities (1), (2), (3), and (4) is set to the corresponding of:

$$48° < |\Theta| < 63° \quad \text{(1a)},$$

$$R\_R45 < 1.2\% \quad \text{(2a)},$$

$$R\_G45 < 1.2\% \quad \text{(3a), and}$$

$$R\_R0 < 0.8\% \quad \text{(4a)}.$$

In another embodiment, at least one of the upper limit value or the lower limit value of any numerical value range of inequalities (1), (2), (3), and (4) is set to the corresponding of:

$$50° < |\Theta| < 60° \quad \text{(1b)},$$

$$R\_R45 < 1.1\% \quad \text{(2b)},$$

$$R\_G45 < 0.9\% \quad \text{(3b), and}$$

$$R\_R0 < 0.5\% \quad \text{(4b)}.$$

Next, specific examples of antireflection films for use in the optical systems OL according to the exemplary embodiments will be described. One of antireflection films of first to third examples described below is formed on the first lens surfaces of the optical systems OL according to the first and second exemplary embodiments.

Figure 6:
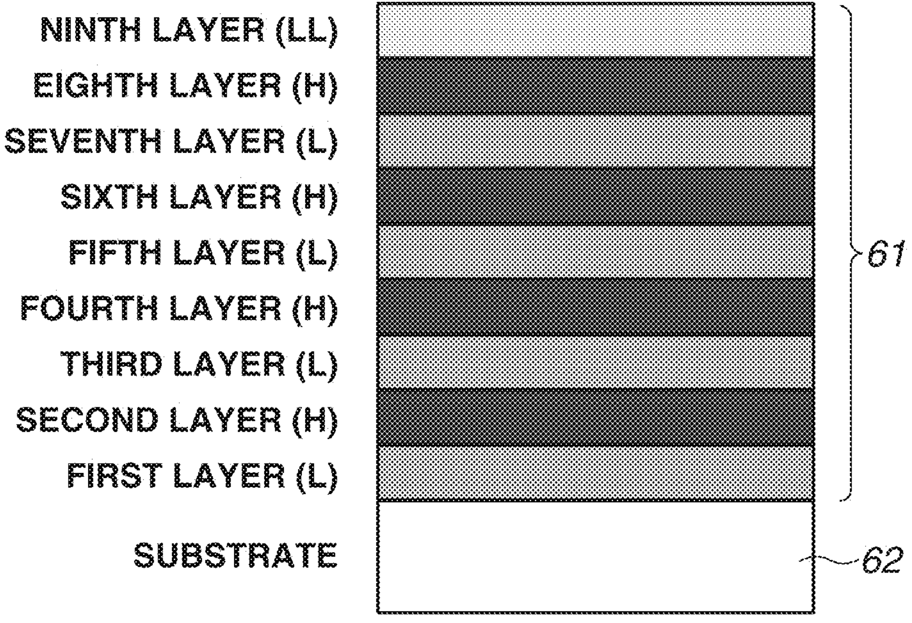
FIG. 6 illustrates the film structure of an antireflection film according to a first example.

FIG. 6 illustrates a film structure of an antireflection film 61 as the antireflection film of the first example.

In FIG. 6, a substrate 62 is a lens including the antireflection film 61. The antireflection film 61 includes first to ninth layers in this order from the substrate 62 toward the air. The first, third, fifth, and seventh layers are designed to be low refractive index layers L. The second, fourth, sixth, and eighth layers are designed to be high refractive index layer H. The ninth layer, which lies closest to or in contact with air, is designed to be a lower refractive index layer LL. With the combination of the high refractive index layers H and the low refractive index layers L, reflection light at boundaries of the layers and light rays incident on the layers are offset by interference, whereby the reflectance is reduced. Further, the nine-layer structure produces a high antireflection effect.

Figure 7:
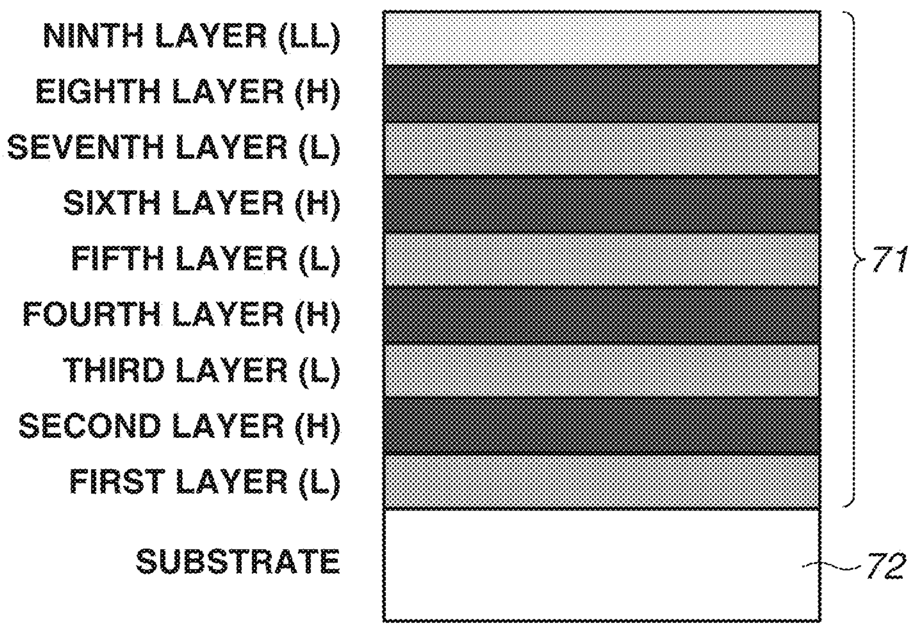
FIG. 7 illustrates the film structure of an antireflection film according to a comparative example.

FIG. 7 illustrates a film structure of an antireflection film 71 as a comparative example. In FIG. 7, the substrate 72 is a lens including the antireflection film 71. The antireflection film 71 includes first to ninth layers from the substrate 72 toward the air. The first, third, fifth, and seventh layers are designed to be low refractive index layers L. The second, fourth, sixth, eighth layers are designed to be high refractive index layers H. The ninth layer, which lies closest to or in contact with air, is designed to be a lower refractive index layer LL.

Table 1 shows a structure of the antireflection film of the first example. Table 2 shows a structure of the antireflection film of the comparative example.

TABLE 1

| | Refractive Index (λ = 587.56 nm) | Position on Optical Axis Optical Thickness (nm) | Position at Opening Angle of 45 degrees Optical Thickness (nm) |
|---|---|---|---|
| Air | 1.000 | | |
| Ninth Layer | 1.386 | 199.5 | 141.1 |
| Eighth Layer | 2.017 | 71.7 | 50.7 |
| Seventh Layer | 1.610 | 90.1 | 63.7 |
| Sixth Layer | 2.017 | 116.1 | 82.1 |
| Fifth Layer | 1.610 | 77.9 | 55.1 |
| Fourth Layer | 2.017 | 51.4 | 36.3 |
| Third Layer | 1.610 | 24.0 | 17.0 |
| Second Layer | 2.017 | 19.3 | 13.6 |
| First Layer | 1.610 | 211.0 | 149.2 |
| Substrate | 1.535 | | |

TABLE 2

| | Refractive Index (λ = 587.56 nm) | Position on Optical Axis Optical Thickness (nm) | Position at Opening Angle of 45 degrees Optical Thickness (nm) |
|---|---|---|---|
| Air | 1.000 | | |
| Ninth Layer | 1.386 | 152.7 | 108.0 |
| Eighth Layer | 2.017 | 56.8 | 40.2 |
| Seventh Layer | 1.610 | 39.3 | 27.8 |
| Sixth Layer | 2.017 | 177.1 | 125.2 |
| Fifth Layer | 1.610 | 29.5 | 20.9 |
| Fourth Layer | 2.017 | 63.3 | 44.8 |
| Third Layer | 1.610 | 71.8 | 50.8 |
| Second Layer | 2.017 | 15.3 | 10.8 |
| First Layer | 1.610 | 93.8 | 66.3 |
| Substrate | 1.535 | | |

The antireflection film in Table 1 uses a substrate (K22R/ZEON) made of a resin material having a refractive index of 1.545 as the substrate 62 in an environment at a room temperature of 25 degrees. Table 1 shows refractive indexes of the antireflection film 61 with respect to d-line and optical thicknesses (refractive index×geometric thickness) of the layers. The optical thicknesses for a position on the optical axis and a position at an opening angle of 45 degrees are shown. The optical thickness varies at different positions due to a film deposition angle. The first, third, fifth, and seventh layers are low refractive index layers L with a refractive index of 1.610, and a film material includes $Al_2O_3$. The second, fourth, sixth, and eighth layers are refractive index layers H with a refractive index of 2.017, and a film material includes $ZrO_2$. The ninth layer, which lies closest to or in contact with air, is a low refractive index layer LL with a refractive index of 1.486, and a film material includes $MgF_2$. The antireflection film 61 exhibits colorless and transparent properties.

The antireflection film in Table 2 uses a substrate (K22R/ZEON) made of a resin material having a refractive index of 1.545 as the substrate 72 in an environment at a room temperature of 25 degrees. Table 1(b) shows refractive indexes of the antireflection film 61 with respect to d-line and optical thicknesses (refractive index×geometric thickness) of the layers. The first, third, fifth, and seventh layers are low refractive index layers L with a refractive index of 1.610, and a film material includes $Al_2O_3$. The second, fourth, sixth, and eighth layers are refractive index layers H with a refractive index of 2.017, and a film material includes $ZrO_2$. The ninth layer, which lies closest to or in contact with air is a low refractive index layer LL with a refractive index of 1.486, and a film material includes $MgF_2$.

FIG. 8 illustrates reflectance properties of the antireflection film of the first example and the antireflection film of the comparative example. In FIG. 8, the horizontal axis represents wavelength (unit: nm), whereas the vertical axis represents reflectance (unit: %). A curve 81 shows the reflectance of light rays vertically incident on a position on the optical axis of the lens surface provided with the antireflection film of the first example. A curve 82 shows the reflectance of light rays vertically incident on a position at an opening angle of 45 degrees on the lens surface provided with the antireflection film of the first example. A curve 83 shows the reflectance of light rays vertically incident on a position on the optical axis of the lens surface provided with the antireflection film of the comparative example. A curve 84 shows the reflectance of light rays vertically incident on a position at an opening angle of 45 degrees on the lens surface provided with the antireflection film of the comparative example.

Comparing the antireflection film of the first example with the antireflection film of the comparative example, the low reflectance range of the reflectance properties of the first example is shifted toward long wavelengths. The antireflection film can be designed to shift the low reflectance range in reflecting light rays vertically incident on a position on the optical axis of the lens surface to the long wavelengths, whereby the reflectance in reflecting light rays vertically incident on a position at an opening angle of 45 degrees on the lens surface is reduced across a range from the visible range to the long wavelength range. Comparing the reflectance properties in reflecting light rays vertically incident on a position at an opening angle of 45 degrees on the lens surface, the reflectance of the first example is reduced to 1.0% or less over the long wavelength range (to 780 nm). Comparing with an antireflection film that uniformly reduces the reflectance across the visible light range, the reflectance at the long wavelengths is reduced, allowing reduction of ghost with high visibility, providing high-quality optical images. Further, even with an image sensor having high sensitivity with respect to long wavelengths provided, e.g., a monitoring camera, ghost and flare are further reduced by reducing the reflectance at long wavelengths, providing a high resolution performance.

Figure 9:
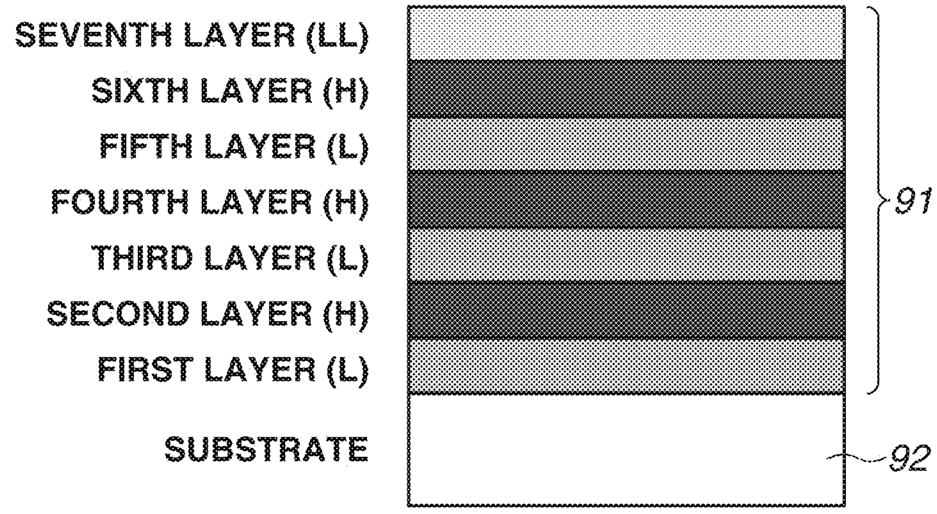
FIG. 9 illustrates the film structure of an antireflection film according to a second example.

FIG. 9 illustrates a film structure of an antireflection film 91 as the antireflection film of the second example. In FIG. 9, a substrate 92 is a lens including the antireflection film 91. The antireflection film 91 includes first to seventh layers in this order from the substrate 92 toward the air. The first, third, and fifth layers are designed to be low refractive index layers L. The second, fourth, and sixth layers are designed to be high refractive index layers H. The seventh layer, which lies closest to or in contact with air, is designed to be a lower refractive index layer LL. The seven-layer structure produces a high antireflection effect.

Table 3 shows a structure of the antireflection film of the second example.

TABLE 3

| | Refractive Index (λ = 587.56 nm) | Position on Optical Axis Optical Thickness (nm) | Position at Opening Angle of 45 degrees Optical Thickness (nm) |
|---|---|---|---|
| Air | 1.000 | | |
| Seventh Layer | 1.386 | 194.4 | 137.4 |
| Sixth Layer | 2.017 | 86.7 | 61.3 |
| Fifth Layer | 1.610 | 42.8 | 30.3 |
| Fourth Layer | 2.017 | 209.5 | 148.1 |
| Third Layer | 1.610 | 55.6 | 39.3 |
| Second Layer | 2.017 | 67.3 | 47.6 |
| First Layer | 1.610 | 216.8 | 153.3 |
| Substrate | 1.516 | | |

The antireflection film in Table 3 uses a substrate (K22R/ZEON) made of a resin material having a refractive index of 1.545 as the substrate 92 in an environment at a room temperature of 25 degrees. The first, third, and fifth layers are low refractive index layers L with a refractive index of 1.610, and a film material includes $Al_2O_3$. The second, fourth, and sixth layers are refractive index layers H with a refractive index of 2.017, and a film material includes $ZrO_2$. The seventh layer, which lies closest to or in contact with air, a low refractive index layer LL with a refractive index of 1.386, and a film material includes $MgF_2$. The antireflection film 91 exhibits colorless and transparent properties.

Figure 10:
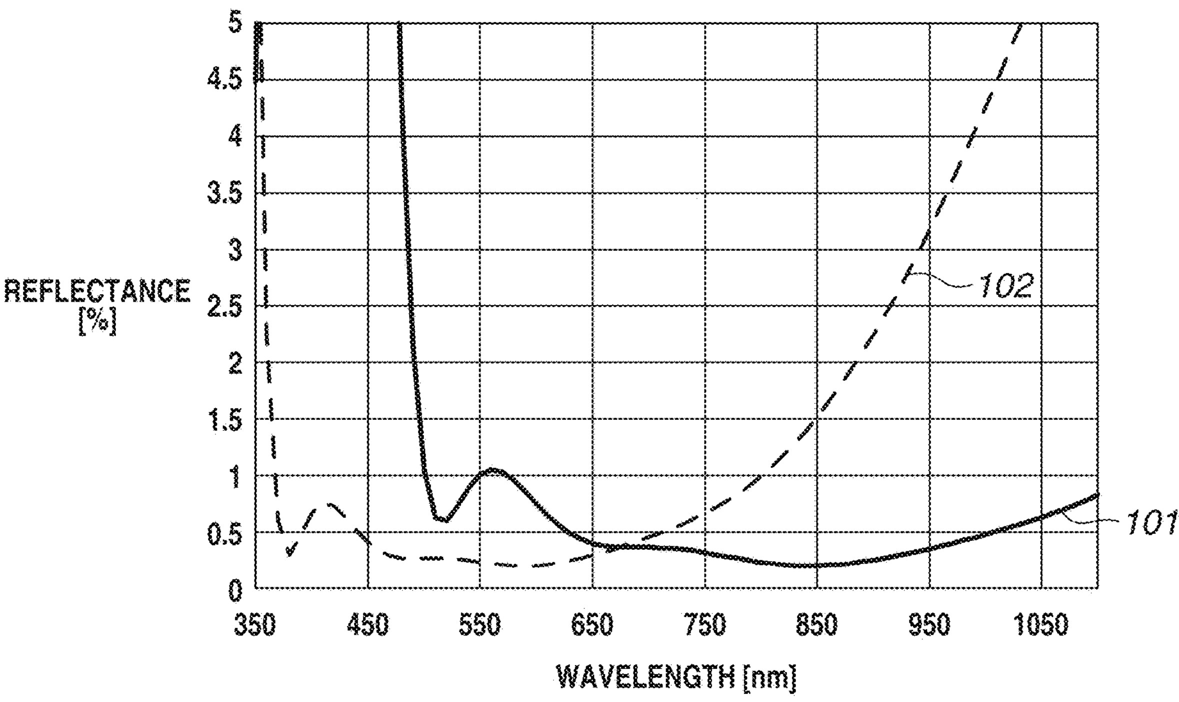
FIG. 10 illustrates reflectance properties of the antireflection film according to the second example.

FIG. 10 illustrates reflectance properties of the antireflection film of the second example. In FIG. 10, the horizontal axis represents wavelength (unit: nm), and the vertical axis represents reflectance (unit: %). A curve 101 shows the reflectance in reflecting light rays vertically incident on a position on the optical axis of the lens surface provided with the antireflection film of the second example. A curve 102 shows the reflectance in reflecting light rays vertically incident on a position at an opening angle of 45 degrees on the optical axis of the lens surface provided with the antireflection film of the second example.

Figure 11:
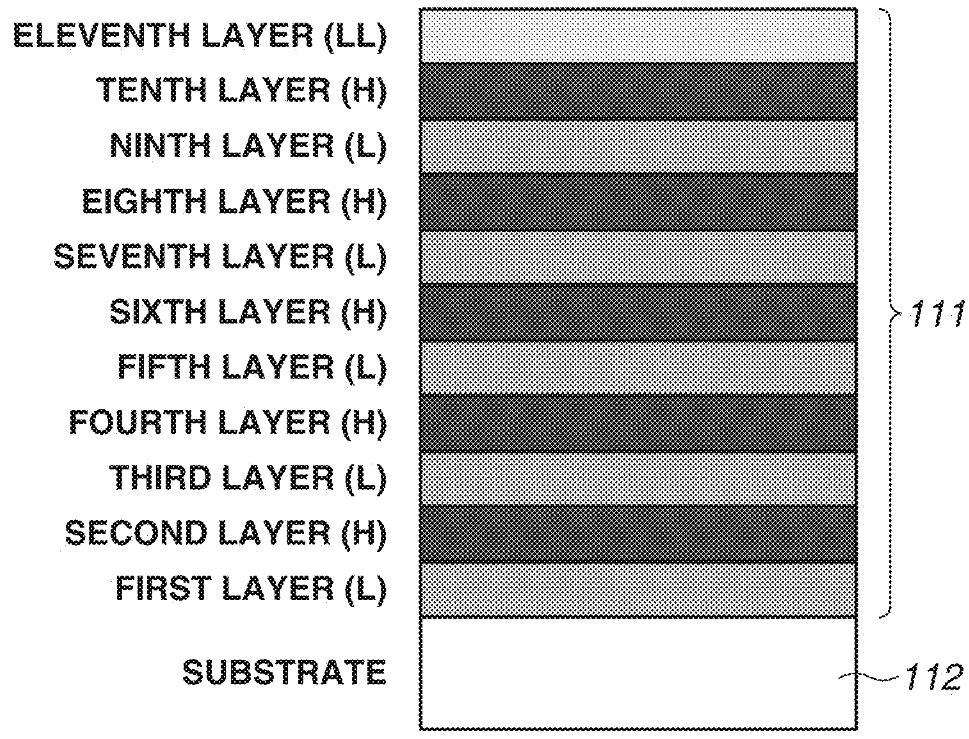
FIG. 11 illustrates the film structure of an antireflection film according to a third example.

FIG. 11 illustrates a film structure of an antireflection film 111 as the antireflection film of the third example.

In FIG. 11, a substrate 112 is a lens including the antireflection film 111. The antireflection film 111 includes first to eleventh layers in this order from the substrate 112 toward the air. The first, third, fifth, seventh, and ninth layer are designed to be low refractive index layers L. The second, fourth, sixth, eighth, and tenth layers are designed to be high refractive index layers H. The eleventh layer, which lies closest to or in contact with air, is designed to be a lower refractive index layer LL. The eleven-layer structure produces a high antireflection effect.

Table 4 illustrates a structure of the antireflection film of the third example.

TABLE 4

| | Refractive Index (λ = 587.56 nm) | Position on Optical Axis Optical Thickness (nm) | Position at Opening Angle of 45 degrees Optical Thickness (nm) |
|---|---|---|---|
| Air | 1.000 | | |
| Eleventh Layer | 1.386 | 195.0 | 137.9 |
| Tenth Layer | 2.017 | 73.6 | 52.1 |
| Ninth Layer | 1.610 | 84.0 | 59.4 |
| Eighth Layer | 2.017 | 135.5 | 95.8 |
| Seventh Layer | 1.610 | 66.8 | 47.3 |
| Sixth Layer | 2.017 | 95.2 | 67.3 |
| Fifth Layer | 1.610 | 94.8 | 67.0 |
| Fourth Layer | 2.017 | 46.9 | 33.2 |
| Third Layer | 1.610 | 88.6 | 62.6 |
| Second Layer | 2.017 | 20.0 | 14.1 |
| First Layer | 1.610 | 202.7 | 143.3 |
| Substrate | 1.531 | | |

The antireflection film in Table 4 uses a substrate (E48R/ZEON) made of a resin material having a refractive index of 1.5311 as the substrate 112 in an environment at a room temperature of 25 degrees. The first, third, fifth, seventh, and ninth layers are low refractive index layers L with a refractive index of 1.610, and a film material includes $Al_2O_3$. The second, fourth, sixth, and eighth layers are refractive index layers H with a refractive index of 2.017, and a film material includes $ZrO_2$. The eleventh layer, which lies closest to or in contact with air, is a low refractive index layer LL with a refractive index of 1.386, and a film material includes $MgF_2$. The antireflection film 111 exhibits colorless and transparent properties.

Figure 12:
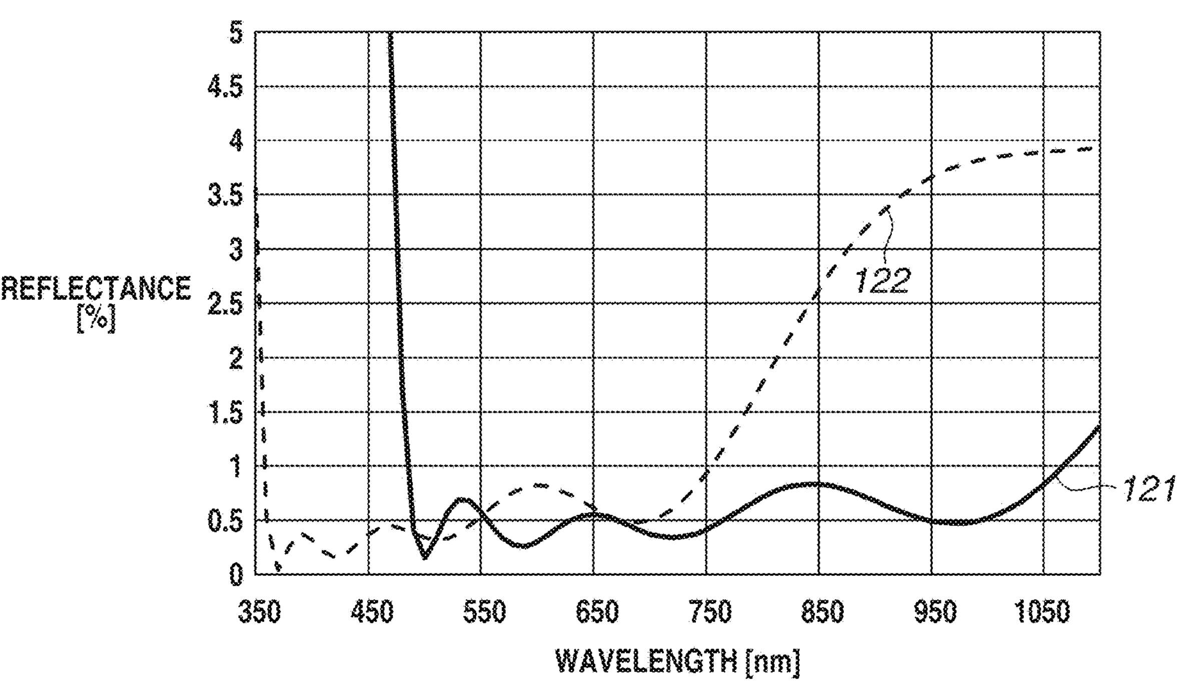
FIG. 12 illustrates reflectance properties of the antireflection film according to the third example.

FIG. 12 illustrates reflectance properties of the antireflection film of the third example. In FIG. 12, the horizontal axis represents wavelength (unit: nm), whereas the vertical axis represents reflectance (unit: %). A curve 121 shows the reflectance in reflecting light rays vertically incident on the optical axis of the lens surface provided with the antireflection film of the third example. A curve 122 shows the reflectance in reflecting light rays vertically incident on a position at an opening angle of 45 degrees on the lens surface provided with the antireflection film of the third example.

Next, inequalities that are satisfied by the optical systems OL according to the exemplary embodiments will be described.

Each optical system OL according to the exemplary embodiments satisfies one or more of the following inequalities:

$$0.0<Rmax\_R0/Rmax\_G0<0.1 \quad (5),$$

$$0.0<Rmax\_R45/Rmax\_G45<4.0 \quad (6),$$

$$0.5<D\_45/D\_0<0.9 \quad (7),$$

$$0.0<Rmin\_R0/Rmin\_G0<3.0 \quad (8),$$

$$0.0<R\_R0/R\_G0<0.9 \quad (9),$$

$$1.0<|fGn/f|<1.8 \quad (10),$$

$$0.05<LGn/TL<0.25 \quad (11),$$

$$0.4<SL/TL<0.8 \quad (12),$$

$$1.45<NdGn<1.65 \quad (13),$$

$$0.3<R\_R45/R\_R0<3.0 \quad (14), \text{ and}$$

$$0.27\lambda<dn<0.40\lambda \quad (15).$$

In the foregoing inequalities, Rmax_G0 is a maximum value of the reflectance in reflecting light rays vertically incident on a position on the optical axis of the first lens surface in the wavelength range of 450 nm to 550 nm. Rmax_R0 is a maximum value of the reflectance in reflecting light rays vertically incident on a position on the optical axis of the first lens surface in the wavelength range of 650 nm to 750 nm. Rmax_G45 is a maximum value of the reflectance in reflecting light rays vertically incident on a position at an opening angle of 45 degrees on the first lens surface in the wavelength range of 450 nm to 550 nm.

Rmax_R45 is a maximum value of the reflectance in reflecting light rays vertically incident on a position at an opening angle of 45 degrees on the first lens surface in the wavelength range of 650 nm to 750 nm. D_45 is an optical thickness of the antireflection film at a position at an opening angle of 45 degrees on the first lens surface, and D_0 is an optical thickness of the antireflection film at a position on the optical axis of the first lens surface.

Rmin_G0 is a minimum value of the reflectance in reflecting light rays vertically incident on a position on the optical axis of the first lens surface in the wavelength range of 480 nm to 550 nm. Rmin_R0 is a minimum value of the reflectance in reflecting light rays vertically incident on a position on the optical axis of the first lens surface in the wavelength range of 650 nm to 850 nm. R_G0 is a reflectance in reflecting a light ray with a wavelength of 530 nm that is vertically incident on a position on the optical axis of the first lens surface.

fGn is a focal length of the negative lens Gn. f is a focal length of the entire system of the optical system OL. LGn is a distance between the surface vertex of the object-side surface of the negative lens Gn and the image plane. TL is a total optical length of the optical system OL.

SL is a distance between the aperture stop SP and the surface vertex of the object-side surface of the negative lens Gn.

NdGn is a refractive index of the negative lens Gn. dn (nm) is an optical thickness of the uppermost layer of the antireflection film for a light ray with a wavelength λ=587.56 nm that is the layer closest to or in contact with air.

Next, technical effects of the above-described inequalities will be described.

Inequality (5) defines the maximum value Rmax_R0 of the reflectance in the wavelength range of 650 nm to 750 nm with respect to the reflectance Rmax_G0 of light rays vertically incident on a position on the optical axis of the first lens surface in the wavelength range of 450 nm to 550 nm. Inequality (5) indicates that Rmax_G0 is greater than Rmax_R0. Specifically, inequality (5) indicates that the low-reflectance wavelength range is shifted to the long wavelengths. This reduces occurrences of ghost with high visibility.

Values of Rmax_R0/Rmax that are greater than the upper limit value of inequality (5) are undesirable because the reflectance at the long wavelengths increases and red ghost is frequently generated and becomes noticeable. Furthermore, it becomes difficult to reduce ghost and flare and the resolution deteriorates with an image sensor having high sensitivity with respect to the long wavelengths. In one embodiment, the lower limit value of inequality (5) is set to zero or greater. Specifically, Rmax_R0 can be set not to be excessively smaller than Rmax_G0 to reduce the difficulty of manufacturing the antireflection film.

Values of Rmax_R45/Rmax_G45 that are greater than the upper limit value of inequality (6) are undesirable because the reflectance at the long wavelengths increases and red ghost is frequently generated and becomes noticeable. Furthermore, it becomes difficult to reduce ghost and flare and the resolution deteriorates with an image sensor having high sensitivity with respect to the long wavelengths. In one embodiment, the lower limit value of inequality (6) is set to zero or greater. Specifically, Rmax_R45 can be set not to be excessively smaller than Rmax_G45 to reduce the difficulty of manufacturing the antireflection film.

Values of D_45/D_0 that are greater than the upper limit value of inequality (7) are undesirable because it becomes more difficult to manufacture the antireflection films according to the exemplary embodiments. This case, for example, entails using an optical thin-film forming apparatus with special specifications including a planetary rotation mechanism. Values of D_45/D_0 that are less than the lower limit value of inequality (7) are undesirable because the reflectance in reflecting light vertically incident on a position at an opening angle of 45 degrees on the first lens surface becomes excessively worse than the reflectance in reflecting light vertically incident on a position on the optical axis of the first lens surface.

Inequality (8) defines Rmin_G0 with respect to Rmin_R0.

Values of Rmin_R0/Rmin_G0 that are greater than the upper limit of inequality (8) are undesirable because the reflectance at the long wavelengths increases and red ghost is frequently generated and becomes noticeable. Values of Rmin_R0/Rmin_G0 that are less than the lower limit of inequality (8) are undesirable because the reflectance in the visible range increases.

Shifting the reflectance properties to the long wavelengths to have a minimum value in the wavelength range of 480 nm to 550 nm is applied because that reduces the reflectance at the long wavelengths and occurrences of ghost with high visibility.

Values of R_R0/R_G0 that are greater than the upper limit value of inequality (9) are undesirable because the reflectance at the long wavelengths increases and red ghost is frequently generated and becomes noticeable. Values of R_R0/R_G0 that are less than the lower limit of inequality (9) are undesirable because the reflectance in the visible range increases.

Values of |fGn/f| that are greater than the upper limit value of inequality (10) are undesirable because field curvatures are over-corrected.

Values of |fGn/f| that are less than the lower limit value of inequality (10) are undesirable because field curvatures are under-corrected.

With a value of LGn/TL that is greater than the upper limit value of inequality (11), off-axis light rays incident on the lens Gn become excessively low. This causes an on-axis light flux and an off-axis light flux that pass through the lens Gn to be inadequately separated in a direction perpendicular to the optical axis, making it difficult to correct field curvatures. Values of LGn/TL that are less than the lower limit value of inequality (11) are undesirable from the point of view of functionality of the optical system OL because it becomes difficult to arrange the optical block FL although the above-described correction effect increases.

With a value of SL/TL that is greater than the upper limit value of inequality (12), off-axis light rays incident on the lens Gn become excessively low. This causes an on-axis light flux and an off-axis light flux that pass through the lens Gn to be inadequately separated in a direction perpendicular to the optical axis, making it difficult to correct field curvatures. Values of SL/TL that are less than the lower limit value of inequality (12) are undesirable because the distance between the aperture stop SP and the lens Gn becomes excessively long, increasing the size of the entire optical system OL.

Inequality (13) defines a refractive index NdGn of the lens Gn in a 25° C. (room temperature) environment. Values of NdGn that are greater than the upper limit value of inequality (13) are undesirable because it becomes difficult to form the lens Gn. Values of NdGn that are less than the lower limit value of inequality (13) are undesirable because an opening angle for providing refractive power to the lens Gn becomes excessively great.

Values of R_R45/R_R0 that are greater than the upper limit value of inequality (14) are undesirable because the reflectance at a position with a great opening angle increases and the antireflection effect at the positions with the great opening angle deteriorates excessively compared with the antireflection effect at a position on the optical axis (the central portion of the lens surface). Values of R_R45/R_R0 that are less than the lower limit value of inequality (14) are undesirable because the reflectance at the central portion of the lens Gn increases and the quantity of transmitted light decreases.

Values of dn that are greater than the upper limit value of inequality (15) are undesirable because the reflectance at the short wavelengths increases and the antireflection effect decreases. Values of dn that are less than the lower limit value of inequality (15) are undesirable because the reflectance at the long wavelengths increases and the antireflection effect decreases.

Further, at least one of the upper limit value or the lower limit value of each numerical range of inequalities (5) to (15) is set to the corresponding range of the following inequalities (5a) to (15a):

$$0.01<Rmax\_R0/Rmax\_G0<0.04 \quad (5a),$$

$$0.5<Rmax\_R45/Rmax\_G45<3.5 \quad (6a),$$

$$0.6<D\_45/D\_0<0.8 \quad (7a),$$

$$0.1<Rmin\_R0/Rmin\_G0<2.5 \quad (8a),$$

$$0.3<R\_R0/R\_G0<0.8 \quad (9a),$$

$$1.1<|fGn/f|<1.7 \quad (10a),$$

$$0.08<LGn/TL<0.20 \quad (11a),$$

$$0.50<SL/TL<0.75 \quad (12a),$$

$$1.49<NdGn<1.60 \quad (13a),$$

$$0.4<R\_R45/R\_R0<2.8 \quad (14a), \text{ and}$$

$$0.302<dn<0.35\lambda \quad (15a).$$

In one embodiment, at least one of the upper limit value or the lower limit value of each numerical range of inequalities (5) to (15) is set to the corresponding range specified by the following inequalities (5b) to (15b):

$$0.020<Rmax\_R0/Rmax\_G0<0.035 \quad (5b),$$

$$0.6<Rmax\_R45/Rmax\_G45<3.0 \quad (6b),$$

$$0.70<D\_45/D\_0<0.75 \quad (7b),$$

$$0.15<Rmin\_R0/Rmin\_G0<2.3 \quad (8b),$$

$$0.4<R\_R0/R\_G0<0.7 \quad (9b),$$

$$1.2<|fGn/f|<1.6 \quad (10b),$$

$$0.10<LGn/TL<0.15 \quad (11b),$$

$$0.6<SL/TL<0.7 \quad (12b),$$

$$1.51<NdGn<1.58 \quad (13b),$$

$$1.1<R\_R45/R\_R0<2.7 \quad (14b), \text{ and}$$

$$0.312<dn<0.34\lambda \quad (15b).$$

Next, a configuration that the optical systems OL according to the exemplary embodiments satisfy will be described.

In one embodiment, the antireflection film provided to the first lens surface includes at least seven layers stacked on top of another. The multi-layer structure of the antireflection film reduces the reflection of incident light over a wide wavelength range. Furthermore, a combination of the high refractive index layers and the low refractive index layers in forming the multi-layer structure of the antireflection film allows reflection light at boundaries of the layers and light rays entering the layers to be offset by interference, whereby the reflectance is reduced.

Further, in one embodiment, the negative lens Gn includes a concave surface on the object side, and the antireflection film is provided to the concave surface as the first lens surface. In this case, the concave surface can be an aspherical surface.

Further, in another embodiment, the image-side lens surface of the negative lens Gn is an aspherical surface that has at least one inflection point. An inflection point is a point at which a value of the second derivative of the function x(h) is zero and at which the second derivative changes sign, where x is an amount of displacement from the surface vertex in the optical axis direction, h is a height in a direction (radial direction) perpendicular to the optical axis, and x(h) is an aspherical surface shape. Specifically, an inflection point is a point at which the surface shape changes from a concave shape to a convex shape or from a convex shape to a concave shape. Having an inflection point makes it possible to determine a peripheral refractive power independently of a paraxial refractive power. This facilitates correction of field curvatures. Furthermore, this prevents an increase in incidence angle of light rays passing through the optical system OL on an image forming plane (image sensor). An inflection point can be disposed at any position outside the optical axis in the radius direction within an effective diameter of the image-side surface of the negative lens Gn, at a peripheral portion.

Further, yet another embodiment, the negative lens Gn is a resin lens. The inclusion of a resin material facilitates processing of a lens shape having an inflection point.

Further, yet another embodiment, if a low-reflection range with low reflectances is to be expanded to the near infrared wavelength range in designing the antireflection film, reflection properties are provided with a fewer films by a trade-off with the reflectance at the short wavelengths. Thus, a maximum value of reflectance in reflecting light rays in a wavelength range of 450 nm to 550 nm that are vertically incident on a position on the optical axis of a first surface is 3% or higher (i.e., 4%). This indicates that the antireflection film according to the present exemplary embodiment is higher in reflectance over the short wavelength range than an antireflection film for use in the normal visible range. As described above, the reflectance over the short wavelength range is intentionally increased to facilitate reduction of the reflectance at the long wavelengths.

First and second numerical examples corresponding respectively to the first and second exemplary embodiments will be described.

In surface data according to the numerical examples, r is a curvature radius of an optical surface, and d (mm) is an on-axis interval (a distance on the optical axis) between mth and (m+1)th surfaces, where m is a surface number counting from a light incidence side. Further, nd is a refractive index of an optical member with respect to d-line, and νd is an Abbe number of an optical member. An Abbe number νd of a material is expressed as follows:

$$\nu d=(Nd-1)/(NF-NC),$$

where Nd, NF, NC, and Ng are respectively refractive indexes at d-line (587.6 nm), F-line (486.1 nm), C-line (656.3 nm), and g-line (wavelength 435.8 nm) of the Fraunhofer lines.

The sign "*" is added to the right of the surface number of each optical surface that is an aspherical surface. An aspherical surface shape is expressed as follows:

$$x=(h^2/R)/[1+\{1-(1+k)(h/R)^2\}^{1/2}]+A4\times h^4+A6\times h^6+A8\times h^8+A10\times h^{10}\ldots,$$

where X is the amount of displacement from the surface vertex in the optical axis direction, h is the height from the optical axis in the direction perpendicular to the optical axis, R is a paraxial radius of curvature, k is a conic constant, and A4, A6, A8, A10, A12, . . . are aspherical surface coefficients of orders. Further, "e±XX" of the aspherical surface coefficient indicates "$\times10^{\pm XX}$".

First Numerical Example

Unit mm
Surface Data

| Surface Number | r | d | nd | vd |
|---|---|---|---|---|
| 1 | −13.230 | 0.65 | 1.56732 | 42.8 |
| 2 | −556.432 | 0.10 | | |
| 3 | 12.115 | 1.63 | 2.00100 | 29.1 |
| 4 | 23.466 | 1.60 | | |
| 5 | ∞ | −0.50 | | |

-continued

| | | | | |
|---|---|---|---|---|
| (Aperture Stop) | | | | |
| 6* | 14.904 | 2.40 | 1.76802 | 49.2 |
| 7* | −23.793 | 0.10 | | |
| 8 | 91.141 | 3.69 | 1.83481 | 42.7 |
| 9 | −9.345 | 0.46 | 1.95906 | 17.5 |
| 10 | 26.563 | 0.86 | | |
| 11 | −51.000 | 0.49 | 1.51742 | 52.4 |
| 12 | 11.704 | 3.89 | 2.00100 | 29.1 |
| 13 | −30.167 | 3.37 | | |
| 14* | −19.774 | 1.20 | 1.53500 | 55.7 |
| 15* | 15.005 | 0.88 | | |
| 16 | ∞ | 0.50 | 1.51633 | 64.1 |
| 17 | ∞ | 0.44 | | |
| Image Plane | ∞ | | | |

Aspherical Surface Data

| | | | | | |
|---|---|---|---|---|---|
| Sixth Surface | | | | | |
| K = 0.00000e+00 | A4 = −1.13433e−04 | A6 = −1.86886e−07 | A8 = −1.33697e−08 | | |
| Seventh Surface | | | | | |
| K = 0.00000e+00 | A4 = 1.63863e−04 | A6 = −1.05546e−06 | A8 = −2.97841e−09 | | |
| Fourteenth Surface | | | | | |
| K = 0.00000e+00 | A4 = −3.79721e−03 | A6 = 8.71603e−05 | A8 = −7.64087e−07 | A10 = −1.93734e−08 | A12 = 4.17224e−10 |
| Fifteenth Surface | | | | | |
| K = 0.00000e+00 | A4 = −2.85274e−03 | A6 = 7.79552e−05 | A8 = −1.39826e−06 | A10 = 1.42733e−08 | A12 = −6.07417e−11 |

| | |
|---|---|
| Focal Length | 12.40 |
| F−number | 1.30 |
| Half Angle of View (°) | 32.82 |
| Image Height | 8.00 |
| Total Lens Length | 21.76 |
| BF | 0.44 |

Second Numerical Example

| Unit mm Surface Data | | | | |
|---|---|---|---|---|
| Surface Number | r | d | nd | vd |
| 1 | −34.075 | 2.70 | 1.65412 | 39.7 |
| 2 | 113.073 | 1.07 | | |
| 3* | 36.667 | 9.04 | 1.85135 | 40.1 |
| 4* | −47.289 | 6.97 | | |
| 5 | ∞ | −0.44 | | |
| (Aperture Stop) | | | | |
| 6 | 44.314 | 7.13 | 1.77250 | 49.6 |
| 7 | −43.910 | 1.24 | 1.95906 | 17.5 |
| 8 | 50.551 | 3.25 | | |
| 9 | 986.796 | 1.33 | 1.51742 | 52.4 |
| 10 | 30.657 | 10.58 | 1.95375 | 32.3 |
| 11 | −91.045 | 12.06 | | |
| 12* | −35.618 | 3.25 | 1.53110 | 55.9 |
| 13* | 62.751 | 2.14 | | |
| 14 | ∞ | 1.35 | 1.51633 | 64.1 |
| 15 | ∞ | 0.29 | | |
| Image Plane | ∞ | | | |

-continued

| Aspherical Surface Data | | | | | |
|---|---|---|---|---|---|
| Third Surface | | | | | |
| K = 0.00000e+00 | A4 = −6.83768e−06 | A6 = −5.74184e−09 | A8 =1.37624e−11 | | |
| Fourth Surface | | | | | |
| K = 0.00000e+00 | A4 = 3.56356e−06 | A6 = −8.14309e−09 | A8 = 1.80140e−11 | | |
| Twelfth Surface | | | | | |
| K = 0.00000e+00 | A4 = −1.77536e−04 | A6 = 7.52910e−07 | A8 = −2.20433e−09 | A10 = 3.38511e−12 | A12 = −1.40735e−15 |
| Thirteenth Surface | | | | | |
| K = 0.00000e+00 | A4 = −1.29198e−04 | A6 = 4.72083e−07 | A8 = 9.75986e−10 | A10 = 1.04486e−12 | A12 = −4.30655e−16 |

| | |
|---|---|
| Focal Length | 33.53 |
| F−number | 1.30 |
| Half Angle of View (°) | 32.83 |
| Image Height | 21.64 |
| Total Lens Length | 61.97 |
| BF | 0.29 |

Further, Table 5 shows various values of the optical systems OL according to the exemplary embodiments, and Table 6 shows various values of the antireflection films of the first to third examples.

TABLE 5

| | First Exemplary Embodiment | Second Exemplary Embodiment |
|---|---|---|
| Θ | 55.767 | 58.282 |
| fGn | −15.757 | −42.295 |
| f | 12.405 | 33.532 |
| LGn | 2.848 | 6.560 |
| TL | 21.588 | 61.506 |
| SL | 14.760 | 41.717 |
| NdGn | 1.535 | 1.531 |
| Inequality (1) | 55.767 | 58.282 |
| Inequality (10) | 1.270 | 1.261 |
| Inequality (11) | 0.132 | 0.107 |
| Inequality (12) | 0.684 | 0.678 |
| Inequality (13) | 1.535 | 1.531 |

TABLE 6

| | First Example | Second Example | Third Example |
|---|---|---|---|
| R_R45 | 1.030 | 0.460 | 0.500 |
| R_G45 | 0.350 | 0.260 | 0.370 |
| R_R0 | 0.390 | 0.370 | 0.370 |
| Rmax_R0 | 0.400 | 0.400 | 0.550 |
| Rmax_G0 | 18.170 | 17.990 | 17.680 |
| Rmax_R45 | 1.110 | 0.670 | 0.930 |
| Rmax_G45 | 0.380 | 0.410 | 0.530 |
| D_45 | 608.819 | 617.388 | 780.023 |
| D_0 | 861.000 | 873.118 | 1103.119 |
| Rmin_R0 | 0.390 | 0.230 | 0.340 |
| Rmin_G0 | 0.180 | 0.600 | 0.150 |
| R_G0 | 0.560 | 0.730 | 0.690 |
| dn | 199.500 | 194.356 | 194.989 |
| Inequality (2) | 1.030 | 0.460 | 0.500 |
| Inequality (3) | 0.350 | 0.260 | 0.370 |
| Inequality (4) | 0.390 | 0.370 | 0.370 |
| Inequality (5) | 0.022 | 0.022 | 0.031 |
| Inequality (6) | 2.921 | 1.634 | 1.755 |
| Inequality (7) | 0.707 | 0.707 | 0.707 |
| Inequality (8) | 2.167 | 0.383 | 2.267 |
| Inequality (9) | 0.696 | 0.507 | 0.536 |
| Inequality (14) | 2.641 | 1.243 | 1.351 |
| Inequality (15) | 0.340λ | 0.331λ | 0.332λ |

[Image Capturing Apparatus]

Figure 14:
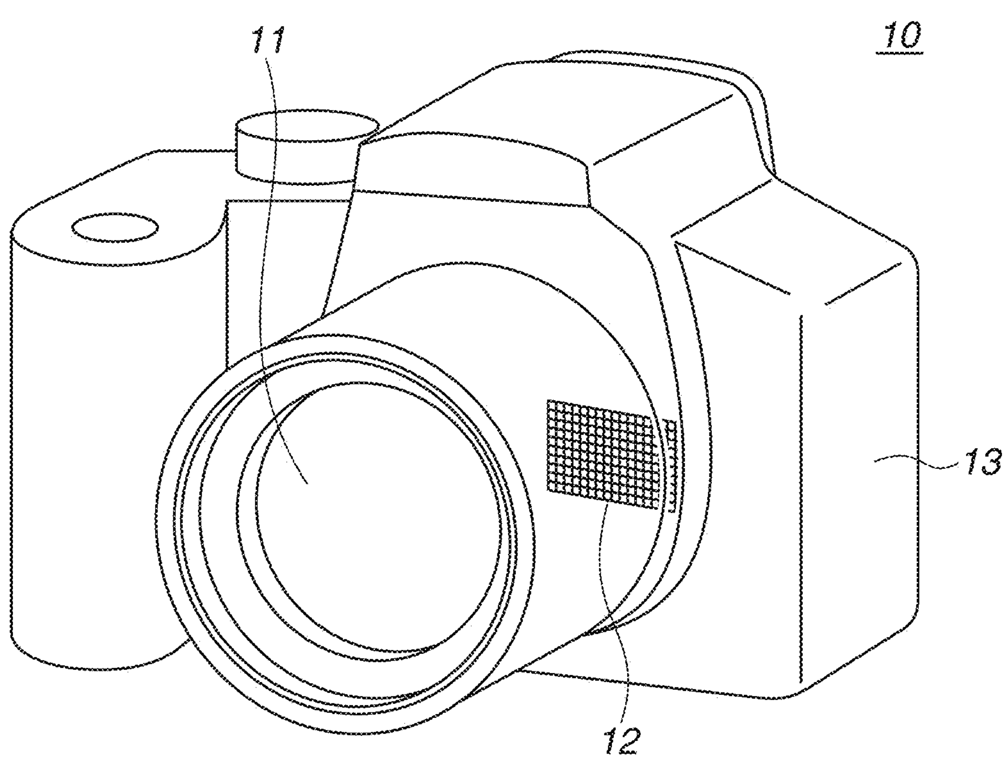
FIG. 14 is a schematic diagram illustrating an image capturing apparatus.

Next, a digital still camera (image capturing apparatus) that uses an optical system according to an exemplary embodiment of the disclosure will be described with reference to FIG. 14. FIG. 14 illustrates a camera body 10 and a lens apparatus 11 including the optical system OL according to the first or second exemplary embodiment.

A solid-state image sensor (photoelectric conversion element) 12 is a CCD sensor or a COMS sensor that is built in the camera body 10 and receives optical images formed by the lens apparatus 11 and photoelectrically converts the received optical images. The camera body 10 can be a so-called single-lens reflex camera including an instant return mirror or a so-called mirrorless camera without an instant return mirror.

As described above, an image capturing apparatus, such as a digital camera, with the optical system OL according to an aspect of the disclosure applied thereto provides high-quality images that have less ghost especially in wavelength ranges with a great aperture and a small size.

The exemplary embodiments and the examples of the disclosure described above are not intended to limit the scope of the disclosure, and various combinations, modifications, and changes are possible within the spirit of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-190616, filed Nov. 24, 2021, which is hereby incorporated by reference herein in its entirety.

What is claimed is:

1. A system consisting of, in order from an object side to an image side, a front lens group and a negative lens Gn, wherein the negative lens Gn includes a first lens surface, and the first lens surface is a lens surface that satisfies the following inequality:

$$45° < |\Theta| < 65°,$$

where $\Theta$ is an opening angle at an effective diameter, wherein the first lens surface is provided with an antireflection film, and wherein the following inequalities are satisfied:

$$R\_R45<1.5\%,$$

$$R\_G45<1.5\%, \text{ and}$$

$$R\_R0<1.0\%,$$

$$0.0<R\text{max}\_R0/R\text{max}\_G0<0.1,$$

where R_R0 is a reflectance in reflecting a light ray with a wavelength of 700 nm that is vertically incident on a position on an optical axis of the first lens surface, R_R45 is a reflectance in reflecting a light ray with a wavelength of 700 nm that is vertically incident on a position at an opening angle of 45 degrees on the first lens surface, R_G45 is a reflectance in reflecting a light ray with a wavelength of 530 nm that is vertically incident on the position at an opening angle of 45 degrees on the first lens surface, Rmax_G0 is a maximum value of a reflectance in reflecting a light ray vertically incident on the position on the optical axis of the first lens surface in a wavelength range of 450 nm to 550 nm, and Rmax_R0 is a maximum value of a reflectance in reflecting a light ray vertically incident on the position on the optical axis of the first lens surface in a wavelength range of 650 nm to 750 nm.

2. The system according to claim 1, wherein the following inequality is satisfied:

$$0.0<R\text{max}\_R45/R\text{max}\_G45<4.0,$$

where Rmax_G45 is a maximum value of a reflectance in reflecting a light ray vertically incident on the position at an opening angle of 45 degrees on the first lens surface in a wavelength range of 450 nm to 550 nm, and Rmax_R45 is a maximum value of a reflectance in reflecting a light ray vertically incident on the position at an opening angle of 45 degrees on the first lens surface in a wavelength range of 650 nm to 750 nm.

3. The system according to claim 1, wherein the following inequality is satisfied:

$$0.5<D\_45/D\_0<0.9,$$

where D_45 is an optical thickness of the antireflection film at the position at an opening angle of 45 degrees on the first lens surface, and D_0 is an optical thickness of the antireflection film at the position on the optical axis of the first lens surface.

4. The system according to claim 1, wherein the following inequality is satisfied:

$$0.0<R\text{min}\_R0/R\text{min}\_G0<3.0,$$

where Rmin_G0 is a minimum value of a reflectance in reflecting a light ray vertically incident on the position on the optical axis of the first lens surface in a wavelength range of 480 nm to 550 nm, and Rmin_R0 is a minimum value of a reflectance in reflecting a light ray vertically incident on the position on the optical axis of the first lens surface in a wavelength range of 650 nm to 850 nm.

5. The system according to claim 1, wherein the following inequality is satisfied:

$$0.0<R\_R0/R\_G0<0.9,$$

where R_G0 is a reflectance in reflecting a light ray with a wavelength of 530 nm that is vertically incident on the position on the optical axis of the first lens surface.

6. The system according to claim 1, wherein the following inequality is satisfied:

$$0.3<R\_R45/R\_R0<3.0.$$

7. The system according to claim 1, wherein the following inequality is satisfied:

$$0.27\lambda<dn<0.40\lambda,$$

where dn (nm) is an optical thickness of an uppermost layer of the antireflection film with respect to a light ray with a wavelength $\lambda$ of approximately 587.56 nm, the uppermost layer being a layer closest to or in contact with air.

8. The system according to claim 1, wherein the antireflection film includes at least seven layers.

9. An apparatus comprising:

a system; and a sensor configured to receive an image formed by the system, wherein the system consisting of, in order from an object side to an image side, a front lens group, and a negative lens Gn, wherein the negative lens Gn includes a first lens surface, and the first lens surface is a lens surface that satisfies the following inequality:

$$45°<|\Theta|<65°,$$

where $\Theta$ is an opening angle at an effective diameter, wherein the first lens surface is provided with an antireflection film, and wherein the following inequalities are satisfied:

$$R\_R45<1.5\%,$$

$$R\_G45<1.5\%,$$

$$R\_R0<1.0\%, \text{ and}$$

$$0.5<D\_45/D\_0<0.9,$$

where R_R0 is a reflectance in reflecting a light ray with a wavelength of 700 nm that is vertically incident on a position on an optical axis of the first lens surface, R_R45 is a reflectance in reflecting a light ray with a wavelength of 700 nm that is vertically incident on a position at an opening angle of 45 degrees on the first lens surface, R_G45 is a reflectance in reflecting a light ray with a wavelength of 530 nm that is vertically incident on the position at an opening angle of 45 degrees on the first lens surface, D_45 is an optical thickness of the antireflection film at the position at an opening angle of 45 degrees on the first lens surface, and D_0 is an optical thickness of the antireflection film at the position on the optical axis of the first lens surface.

10. An apparatus comprising:

a system; and a sensor configured to receive an image formed by the system, wherein the system consisting of, in order from an object side to an image side, a front lens group, and a negative lens Gn, wherein the negative lens Gn includes a first lens surface, and the first lens surface is a lens surface that satisfies the following inequality:

$$45°<|\Theta|<65°,$$

where Θ is an opening angle at an effective diameter, wherein the first lens surface is provided with an antireflection film, and wherein the following inequalities are satisfied:

$$R\_R45<1.5\%,$$

$$R\_G45<1.5\%,$$

$$R\_R0<1.0\%, \text{ and}$$

$$0.0<R\max\_R0/R\max\_G0<0.1,$$

where R_R0 is a reflectance in reflecting a light ray with a wavelength of 700 nm that is vertically incident on a position on an optical axis of the first lens surface, R_R45 is a reflectance in reflecting a light ray with a wavelength of 700 nm that is vertically incident on a position at an opening angle of 45 degrees on the first lens surface, R_G45 is a reflectance in reflecting a light ray with a wavelength of 530 nm that is vertically incident on the position at an opening angle of 45 degrees on the first lens surface, Rmax_G0 is a maximum value of a reflectance in reflecting a light ray vertically incident on the position on the optical axis of the first lens surface in a wavelength range of 450 nm to 550 nm, and Rmax_R0 is a maximum value of a reflectance in reflecting a light ray vertically incident on the position on the optical axis of the first lens surface in a wavelength range of 650 nm to 750 nm.

11. An apparatus comprising:

a system; and a sensor configured to receive an image formed by the system, wherein the system consisting of, in order from an object side to an image side, a front lens group, and a negative lens Gn, wherein the negative lens Gn includes a first lens surface, and the first lens surface is a lens surface that satisfies the following inequality:

$$45°<|\Theta|<65°,$$

where Θ is an opening angle at an effective diameter, wherein the first lens surface is provided with an antireflection film, and wherein the following inequalities are satisfied:

$$R\_R45<1.5\%,$$

$$R\_G45<1.5\%,$$

$$R\_R0<1.0\%, \text{ and}$$

$$0.5<D\_45/D\_0<0.9,$$

where R_R0 is a reflectance in reflecting a light ray with a wavelength of 700 nm that is vertically incident on a position on an optical axis of the first lens surface, R_R45 is a reflectance in reflecting a light ray with a wavelength of 700 nm that is vertically incident on a position at an opening angle of 45 degrees on the first lens surface, R_G45 is a reflectance in reflecting a light ray with a wavelength of 530 nm that is vertically incident on the position at an opening angle of 45 degrees on the first lens surface, D_45 is an optical thickness of the antireflection film at the position at an opening angle of 45 degrees on the first lens surface, and D_0 is an optical thickness of the antireflection film at the position on the optical axis of the first lens surface.

* * * * *